United States Patent [19]

Czaja

[11] Patent Number: 4,878,349

[45] Date of Patent: Nov. 7, 1989

[54] ATMOSPHERIC LATENT HEAT ENGINE

[76] Inventor: Julius Czaja, 229 Village Blvd. S., Baldwinsville, N.Y. 13027

[21] Appl. No.: 283,567

[22] Filed: Dec. 13, 1988

[51] Int. Cl.$^4$ .............................................. F02C 1/04
[52] U.S. Cl. ....................................... 60/674; 60/649; 60/641.12; 60/641.14; 60/641.1; 60/682
[58] Field of Search ............... 60/649, 674, 641.1, 60/641.6, 641.11, 641.12, 641.13, 641.14, 650, 682

[56] References Cited

U.S. PATENT DOCUMENTS

| | | | |
|---|---|---|---|
| 3,894,393 | 7/1975 | Carlson | 60/641.11 |
| 4,106,294 | 8/1978 | Czaja | 60/649 |
| 4,106,295 | 8/1978 | Wood | 60/649 |
| 4,244,189 | 1/1981 | Bliamptis | 60/641.11 |
| 4,367,627 | 1/1983 | Pretini | 60/641.12 |
| 4,453,383 | 6/1984 | Collins | 60/641.14 |

Primary Examiner—Allen M. Ostrager
Attorney, Agent, or Firm—Stonebraker, Shepard & Stephens

[57] ABSTRACT

An atmospheric latent heat engine has a passageway extending from a converging entrance nozzle upward to an exit at a substantially higher elevation. Turbo generators, arranged within the passageway, can be powered to start up an air flow through the passageway; condensate is removed downstream of the nozzle; and a boiler injects warm water vapor into the air mixture before it rises in the elevator. Once a design flow state is established, by cooperation of the turbo generators and the boiler, the turbo generators can be switched to output work derived from the air flow and the vapor expansion.

6 Claims, 1 Drawing Sheet

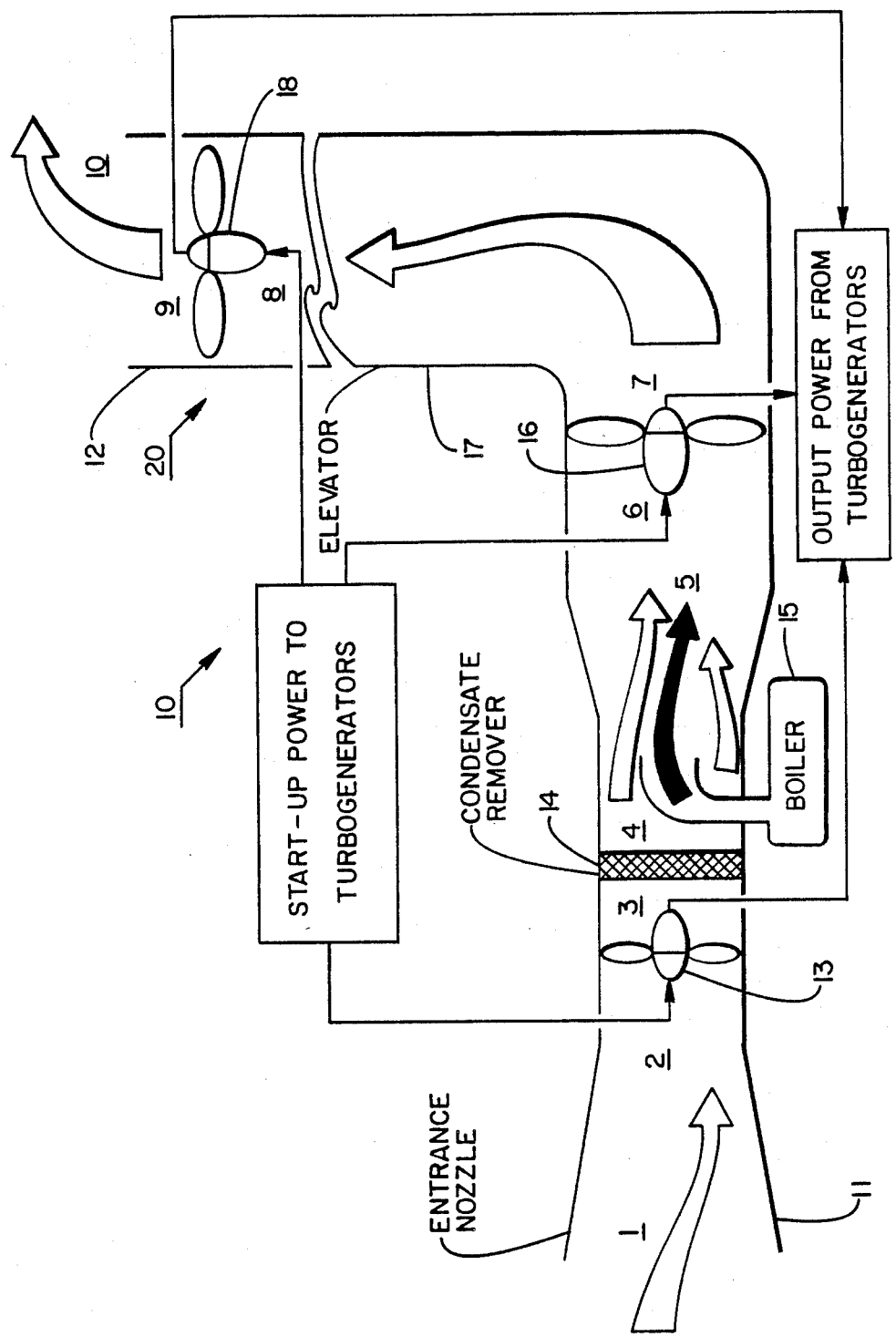

ATMOSPHERIC LATENT HEAT ENGINE

BACKGROUND

The atmospheric latent heat engine of this application follows a succession of earlier latent heat engines designed to extract energy from the atmosphere. One of these is explained in my U.S. PAT. NO. 4,106,294 and another is the subject of my copending application SER. NO. 231,898, filed 15 AUG 1988, entiled OPEN CYCLE LATENT HEAT ENGINE. The present engine differs from its predecessors in the way that atmospheric air and water vapor are made to flow through a passageway to power a turbo generator. In doing this, my atmospheric latent heat engine aims at improved efficiency in producing energy from atmospheric air.

SUMMARY OF THE INVENTION

My atmospheric latent heat engine uses a passageway that extends between a lower and a higher elevation, and the passageway has a converging nozzle entrance at the lower elevation and an exhaust exit at the higher elevation. A turbo generator arranged within the passageway can be driven to establish a flow of air and water vapor through the passageway from the entrance to the exit. A condensate remover, arranged downstream of the input nozzle, removes condensate from atmospheric air expanded in the nozzle. A boiler, arranged downstream of the condensate remover, mixes warm water vapor with the air and water vapor mixture flowing in the passage to saturate the air with warm water vapor and cause the mixture to rise to the higer elevation and exhaust through the exit. When the flow established by the turbo generator and the warm vapor from the boiler reaches an adequately high velocity, the turbo generator can be turned by the flowing mixture, to extract energy from the flow through the passage.

DRAWING

The drawing schematically illustrates a perferred embodiment of my atmospheric latent heat engine.

DETAIL DESCRIPTION

My atmospheric latent heat engine 10 includes a passageway 20 that serves several purposes. An entrance is formed as a converging nozzle 11 admitting atmospheric air at a lower level, to flow through passageway 20 to an exit 12 at a substantially higher elevation. The difference in elevation between entrance nozzle 11 and exit 12 can vary considerably, and may depend on where passageway 20 is located and how it is constructed. In the calculations that follow, I placed exit 12 at a 4,000 higher elevation than entrance nozzle 11. This can be done, for example, by extending passageway 20 up a mountain or up a shaft bored within a mountain.

Downstream of entrance nozzle 11 is a turbo generator 13 followed by a condensate remover 14. Atmospheric air is accelerated and expanded, as it flows through nozzle 11. and this lowers the air temperture and condenses the water vapor in the incoming air. The condensate is removed from passageway 20 by condensate remover 14.

Next along passageway 20 is a boiler 15 that injects hot water vapor into the air. The water vapor from boiler 15 is preferably well mixed into the passing air and has the effect of raising the temperature of the flowing air and saturating it. The new mixture is adiabatically expanded in passageway 20 downstream of boiler 15 as schematically shown by the enlargement of passageway 20.

Another turbo generator 16 is preferably arranged downstream of boiler 15 in the path of the warmed and expanded following air. Turbo generator 16, along with other turbo generators in passageway 20, is available for establishing a start-up flow through passageway 20 and later extracting energy from the established flow in passageway 20.

Beyond turbo generator 16, passageway 20 turns upward in a vertically extending elevator 17, leading toward the higher elevation of exit 12. This operates similar to a elevation. Elevator 17 is schematically enlarge in the drawing to show the expansion of the rising mixture of air and water vapor. This continues until the mixture is exhausted through exit 12, after it passes through another turbo generator 18.

In operation, boiler 15 is fired to produce steam, admitted initially at preferably atmospheric pressure into passageway 20; and turbo generators 13, 16 and 18 are driven to act as blowers, causing air to flow through passageway 20. This draws ambient atmosphere into entrance nozzle 11, where the air is expanded and cooled, and it exhausts adiabatically expanded air and water vapor from exit 12 at a higher elevation.

As the flow velocity gradually increases from the combined effect of steam from boiler 15 and fan energy from the turbo generator, nozzle 11 produce a greater acceleration of the air flow and a greater pressure drop across its length. This condenses some of the water vapor mixed with the inflowing air, and condensate remover 14 collects the water and conducts it out of passageway 20. Also, the increasing air velocity in passageway 20 reduces the power required for driving the turbo generators. When the flow velocity reaches the design condition explained in the following calculations, the turbo generators no longer require start-up power and can be switched to produce output power from the passing flow, so that the system produces work from the combination of atmospheric pressure and energy input from boiler 15.

In a steady flow state, the general energy equation must account for:

| | | | |
|---|---|---|---|
| | A. | Energy of Elevation | $M'Z_1$ |
| | B. | Kinetic Energy | $M'V_1^2 \div 64.34$ |
| Enthalpy | C. | Internal Energy | $JE_1$ |
| | D. | Flow Energy | $P_1V_1$ |
| | | Enthalpy (h) = $(JE_1 + P_1V_1)$ | |
| | E. | Work Out | $M\ W_O$ |
| | F. | Heat In | $M\ JQ$ in. |

At any point along passageway 20, the total energy of the flow equals: $PE_1 + KE_1 + H_1 + W + Q$. This is shown in the following tables, for the points numbered within circles in the drawing.

TABLE 1

| | Atmospheric Condition: 14.7 lbs. per square inch, 70° F. and 60° F. dew point | | |
|---|---|---|---|
| | VAPOR | AIR | MIXTURE |
| M | 010952604 | 1.000 | 1.010952604 |
| Q | SUPERHEAT | | |
| P | .2563 | 14.4437 | 14.7 |
| V | | 13.47086658 | |
| T | 70° F. | 529.6° R | 70° F. (529.6° R) |
| D.P. | | | 60° F. (519.6° R) |
| S | .022044438 | .020513894 | .042558332 |
| H | 11.96791039 | 9.158 | 21.12591039 |
| ρ | | | .075047333 |

$$\rho = \text{density} = \frac{\text{Volume}}{MT} = \frac{13.47086658}{1.010952604}$$

$V_{a60°} = 52.904 \times 519.6 \div (144 \times 14.4437) = 13.21650731$
$M_V = V_{a60°} \div 1206.7 = .010952604$ $$S_v = M_v \left[ S_{60} + .36 L_n (P_{70} \div P_{32}) + .47 L_n \left( \frac{V_{70}}{M_v} \div V_{32} \right) \right]$$

$$= M_v \left[ 2.0948 + .36 L_n (.2563 \div 08854) + .47 \times L_n \left( \frac{V_{70}}{M_v} \div 3306 \right) \right]$$

$$= .022044438$$

$H_V = M_v (1088 + .47 \Delta T) = 11.96791039$

TABLE 2

| | Nozzle - Adiabatic Expansion to 35° F. | | |
|---|---|---|---|
| | VAPOR | AIR | MIXTURE |
| M | .010952604 | 1.000 | 1.010952604 |
| Q | .563432529 | | |
| P | .09995 | 9.991633586 | 10.09158359 |
| V | 18.18626982 | 18.18626983 | 18.18626983 |
| T | 35° F. | 494.6° R. | 35° F. (494.6° R.) |
| S | .013463551 | .029094781 | 0.42558332 |
| H | 6.661405317 | .723 | 7.384405317 |
| ρ | | | .055588783 |

$KE_2 = H_1 - H_2 = 13.74150507$ $Vel_2 = \sqrt{2gJ\Delta H} = 829.3683882$ (565.5 miles/hr.)

Total Energy = KE + H = 21.12591039

TABLE 3

| | Downstream of Turbo Generator 13 | | |
|---|---|---|---|
| | VAPOR | AIR | MIXTURE |
| M | .010952604 | 1.000 | 1.010952604 |
| Q | .563432529 | | |
| P | .09995 | 9.991633586 | 10.09158359 |
| V | 18.18626982 | 18.18626983 | 18.18626983 |
| T | 35° F. | 494.6° R. | 35° F. (494.6° R.) |
| S | .013463551 | .029094781 | .042558332 |
| H | 6.661405317 | .723 | 7.384405317 |
| ρ | | | .055588783 |

Turbo generator 13 reduces velocity from 829.3683882 to
$Vel_3 = 414.6841941$ (282.7 MPH)

$$\text{Work Out} = \left( \frac{V_3^2 - V_2^2}{2gJ} \right) M_m = -10.41900775$$

$$KE_3 = M \left( \frac{V^2}{2gJ} \right) = 3.473002583$$

Total Energy = KE + H = 10.85740790

TABLE 4

| | Condensate Removed | | |
|---|---|---|---|
| | VAPOR | AIR | MIXTURE |
| M | .006171113 | 1.000 | 1.006171113 |
| Q | SATURATED | | |
| P | .09995 | 9.991633586 | 10.09158359 |
| V | 18.18626983 | 18.18626983 | 18.18626983 |
| T | 35° F. | 494.6° R. | |
| S | .013434513 | .029094781 | .042529294 |
| H | 6.646905746 | .723 | 7.369905746 |
| ρ | | | .055325865 |

$Vel_4 = 414.6841941$ ft./sec. (282.7 MPH)

$$KE_4 = M \left( \frac{V^2}{2gJ} \right) = 3.456576363$$

Total Energy = KE + H = 10.82648211

TABLE 5

| | Boiler Adds .01 lbs. saturated steam per lbs. dry air at 194° F. | | | |
|---|---|---|---|---|
| | STEAM | VAPOR | AIR | MIXTURE |
| M | .010 | .006171113 | 1.000 | 1.016171113 |
| Q | SATURATED | SATURATED | | |
| P | 10.168 | .09995 | 9.991 | |
| V | | 18.18626983 | 18.18626983 | |
| T | 194° F. | 35° F. | 494.6° R | |
| S | .0178630 | .013434513 | .029094781 | .060392294 |
| H | 11.436 | 6.646905746 | .723 | 18.80590575 |

Boiler adds to the flowing stream:
M = + .01
S = + .017863
H = 11.436

TABLE 6

| | Mixing and Expansion to 49° F. | | |
|---|---|---|---|
| | VAPOR | AIR | MIXTURE |
| M | .016171113 | 1.000 | 1.016171113 |
| Q | .668575101 | | |
| P | .17157 | 9.793222731 | 9.965014731 |
| V | 19.07949595 | 19.07949593 | 19.07949593 |
| T | 49° F. | 508.6° R. | 49° F. (508.6° R.) |

TABLE 6-continued

Mixing and Expansion to 49° F.

| | VAPOR | AIR | MIXTURE |
|---|---|---|---|
| S | .023208231 | .037184063 | .060392294 |
| H | 11.80229141 | 4.097 | 15.89929141 |
| ρ | | | .053259851 |

$KE_6 = KE_4 + \Delta H_5 \longrightarrow 6$ $3.456576363 + 2.906614340 = 6.363190703$ $Vel_6 = \sqrt{KE \times 2gJ \div M} = 559.8663606$ ft./sec.

(381.7 MPH)

Total Energy = KE + H = 22.26248211

TABLE 7

Downstream of Turbo Generator 16

| | VAPOR | AIR | MIXTURE |
|---|---|---|---|
| M | .016171113 | 1.000 | 1.016171113 |
| Q | .668575101 | | |
| P | .17157 | 9.793444731 | 9.965014731 |
| V | 19.07949595 | 19.07949593 | 19.07949593 |
| T | 49° F. | 508.6° R. | 49° F. (508.6° R.) |
| S | .023208231 | .037184063 | .060392294 |
| H | 11.80229141 | 4.097 | 15.89929141 |
| ρ | | | .053259851 |

Turbo generator reduces velocity from 559.8663606 ft./sec. to
$Vel_7 = 279.933180$ ft./sec. (190.9 MPH)

$Work\ Out = \left(\frac{V_7^2 - V_6^2}{2gJ}\right)M_m = -4.772393016$ $KE_7 = M\left(\frac{V^2}{2gJ}\right) = 1.590797672$ Total Energy = KE + H = 17.49008908

TABLE 8

Flow Rises 4000 feet in Elevator and Cools to 49 − (4 × 3.5) = 35° F.

| | VAPOR | AIR | MIXTURE |
|---|---|---|---|
| M | .016171113 | 1.000 | 1.016171113 |
| Q | .472967951 | | |
| P | .09995 | 8.061639567 | 8.161589567 |
| V | 22.54014743 | 22.54014744 | 22.54014744 |
| T | 35° F. | 494.6° R. | 35° F. (494.6° R.) |
| S | .016702595 | .043689699 | .060392294 |
| H | 8.264002727 | .723 | 8.987002727 |
| ρ | | | .045082718 |

$PE = M_m \times 4000 \div 778 = 5.224530144$ $KE_8 = Total\ E_7 - PE_8 - H_8$ $= 17.49008908 - 5.22453014 - 8.987002727$ $= 3.278556213$ $Vel_8 = \sqrt{2gJ \times KE \div M} = 401.8724379$ ft./sec.

(274.0 MPH)

Total Energy = PE + KE + H = 17.49008908

TABLE 9

Downstream of Turbo Generator 18

| | VAPOR | AIR | MIXTURE |
|---|---|---|---|
| M | .016171113 | 1.000 | 1.016171113 |
| Q | .472967951 | | |
| P | .09995 | 8.061639567 | 8.161589567 |
| V | 22.54014743 | 22.54014744 | 22.54014744 |
| T | 35° F. | 494.6° R. | 35° F. (494.6° R.) |
| S | .016702595 | .043689699 | .060392294 |
| H | 8.264002727 | .723 | 8.987002727 |
| ρ | | | .045082718 |

Turbo generator slows velocity from 401.8724379 ft./sec. to
$Vel_9 = 200.936219$ ft./sec. (137.0 MPH)

$Work\ Out = \left(\frac{Vel_9^2 - Vel_8^2}{2gJ}\right)M_m = -2.45891760$ $KE_9 = M\left(\frac{V^2}{2g}\right) = .819639054$ Total Energy = PE + KE + H = 15.03117192

TABLE 10

Atmospheric Air from Table 1 Expanded Adiabatically as It Lifts to 4000 feet and Cools to $T_{4000} = 70 - (3.5 \times 4) = 56°$ F. (515.6° R)

| | VAPOR | AIR | MIXTURE |
|---|---|---|---|
| M | .010952604 | 1.000 | 1.010952604 |
| Q | .952847243 | | |
| P | .222 | 13.12983442 | 13.35183442 |
| V | 14.42712111 | 14.42712109 | |
| T | 56° F. | 515.6°R | 56° F. (515.6° R) |
| S | .022015759 | .020542573 | .042558332 |
| H | 11.34880724 | 5.784 | 17.13280724 |
| ρ | | | .070073066 |

The exhaust mixture of Table 9 enters the free atmosphere at 4000 ft. with a velocity of 200 ft./sec. +and a density of 0.045 lbs/ft.³.

Buoyancy and velocity will combine with additional latent heat of condensation to remove the moving air stream away from the elevator exhaust permitting continuous flow through the engine. The work output from the turbo generators is:

| Turbo Generator | 13 | 10.419 | |
|---|---|---|---|
| | 16 | 4.772 | |
| | 18 | 2.459 | |
| Total Work Out (BTU) | | 17.650 | BTU per lb. of dry air entering nozzle |

The symbol and constants used in the above calculations are as follows:

Table of Symbols

| | | | | |
|---|---|---|---|---|
| M | Mass | M vapor + | M air = | M mixture |
| Q | Steam Quality | Q vapor | — | — |
| P | Pressure | P vapor + | P air = | P mixture |
| V | Volume | V vapor = | V air = | V mixture |
| T | Temperature | °F. = | °R | (°F.) (°R) |
| ρ | Density | ρ vapor + | ρ air = | ρ mixture |
| S | Entropy | S vapor + | S air = | S mixture |
| H | Enthalpy | H vapor + | H air = | H mixture |

Table of Reference State Conditions

| | AIR | VAPOR |
|---|---|---|
| $T_0$ | 32° F. (491.6° R) | 32° F. |
| $P_0$ | 15#/in.² | .08854 |
| $V_0$ | 12.04055852 | 3306 |

-continued

| Table of Reference State Conditions | | |
|---|---|---|
| | AIR | VAPOR |
| $H_0$ | 0 | 1075.8 |
| $S_0$ | 0 | 2.1877 |

| Table of Gas Constants, Air, and Water Vapor Values | | |
|---|---|---|
| GAS CONSTANTS | AIR | WATER VAPOR |
| Cp | .241 | .47 |
| Cv | .173 | .36 |
| $k = \dfrac{Cp}{Cv}$ | 1.393063584 | 1.305555556 |
| $R = J(Cp-Cv)$ | 52.904 | 85.58 |

Table of Steam Values
From "Thermodynamic Properties of Steam",
Keenan & Keyes, First Edition, Fourteenth Printing (1947)

| °F. Temp. | Press. | Vf | Vfg | Vg | hf | hfg | hg | Sf | Sfg | Sg |
|---|---|---|---|---|---|---|---|---|---|---|
| 35 | .09995 | .01602 | 2947.0 | 2947.0 | 3.02 | 1074.1 | 1077.1 | .0061 | 2.1709 | 2.1770 |
| 49 | .17157 | .01603 | 1764.7 | 1764.7 | 17.07 | 1066.1 | 1083.2 | .0341 | 2.0946 | 2.1297 |
| 56 | .22200 | .01603 | 1382.7 | 1382.4 | 24.06 | 1062.2 | 1086.3 | .0478 | 2.0594 | 2.1072 |
| 70 | .36310 | .73920 | 867.8 | 867.9 | 38.04 | 1054.3 | 1092.3 | .0745 | 1.9902 | 2.0647 |
| 194 | 10.168 | .01659 | 37.07 | 37.09 | 162.97 | 981.6 | 1143.6 | .2846 | 1.5017 | 1.7863 |

It is not necessary to use all three turbo generators 13, 16, and 18; and a single turbo generator may be adequate. I prefer at least two turbo generators, one at the position of generator 18, near the exit from passageway 20, and one at the position of generator 13, downstream from entrance nozzle 11.

The calculations for operating states will vary with different atmospheric condition and will produce differing amount of output work. The calculations will also be affected by the design of passageway 20 and the elevation selected for exit 12.

What is claimed is:

1. An atmospheric latent heat engine comprising:
   a. a passageway extending between a lower and a higher elevation, said passageway having a converging nozzle entrance at said lower elevation and an exhaust exit at said higher elevation:
   b. a turbo generator arranged within said passageway, said turbo generator being powered to cause a mixture of air and water vapor to flow within said passageway from said entrance to said exit, and said turbo generator being arranged to be driven by output energy from said mixture of air and water vapor flowing in said passageway;
   c. a condensate remover arranged downstream of said input nozzle for removing condensate from atmospheric air expanded in said nozzle; and
   d. a boiler arranged downstream of said condensate remover for mixing warm water vapor with said air and water vapor mixture flowing in said passageway so that said mixture of air and said warm water vapor rises to said higher elevation and exhausts through said exit.

2. The engine of claim 1 including a plurality of said turbo generators arranged along said passageway.

3. The engine of claim 1 wherein said turbo generator is arranged in a region of said exit from said passageway.

4. A method of operating an atmospheric latent heat engine, said method comprising:
   a. admitting ambient atmosphere at a lower elevation to flow into a converging nozzle forming an entrance to a flow passageway leading from said lower elevation to an exit at a substantially higher elevation;
   b. powering a turbo generator to establish flow through said passageway from said entrance nozzle to said exit;
   c. removing condensate from air flowing in said passageway downstream from said entrance nozzle;
   injecting warm water vapor into said passageway downstream from said condensate remover, to mix said warm water vapor with air flowing in said passageway; and
   e. once a substantial flow is established from said entrance nozzle to said exit, operating said turbo generator to extract an output energy from said flow.

5. The method of claim 4 including arranging a plurality of said turbo generators along said passageway.

6. The method of claim 4 including arranging said turbo generator in a region approximate to and upstream of said exit from said passageway.

* * * * *